United States Patent [19]

Billings

[11] Patent Number: 5,526,899

[45] Date of Patent: Jun. 18, 1996

[54] GREASE FITTING ADAPTER FOR THE SUSPENSION FOR HEAVY DUTY VEHICLES

[76] Inventor: Richard C. Billings, 914 Holy Cross Rd., Street, Md. 21154

[21] Appl. No.: 402,715

[22] Filed: Mar. 13, 1995

[51] Int. Cl.$^6$ .................................................. F01M 11/04
[52] U.S. Cl. ....................................... 184/105.3; 184/109
[58] Field of Search ............................... 184/6.19, 105.3

[56] References Cited

U.S. PATENT DOCUMENTS

| | | | |
|---|---|---|---|
| 1,447,177 | 3/1923 | Hirst . | |
| 1,580,181 | 4/1926 | Van Pelt . | |
| 2,003,032 | 5/1935 | Barks et al. | 184/105 |
| 2,003,709 | 6/1935 | Eisenhauser et al. | 184/105.3 |
| 2,141,220 | 12/1938 | Olsen | 184/105.3 |
| 2,614,660 | 10/1952 | House | 184/1 |
| 3,743,054 | 4/1973 | Jones, Jr. | 184/14 |
| 5,339,924 | 8/1994 | Martens | 184/40 |

FOREIGN PATENT DOCUMENTS 0352726  7/1931  United Kingdom ................ 184/105.3

OTHER PUBLICATIONS

Gihon's Grease Clamp-on For Model "A" Fords 1 Sheet Dated Dec. 1930..

Primary Examiner—Thomas E. Denion
Attorney, Agent, or Firm—Leonard Bloom

[57] ABSTRACT

A grease fitting adapter for lubricating a Hendrickson suspension of a vehicle. The adapter includes a bracket and a hose connected to the bracket. The hose has a first end with a fitting thereon to cooperate with a fitting in the Hendrickson suspension. The hose has a second end with a fitting thereon to receive the lubricant from a source of lubricant. The adapter is mounted on the Hendrickson suspension by a fastener connected to the bracket and is mounted such that the lubricant is introduced from the outer side of the vehicle. A retrofit kit and a method of lubricating the Hendrickson suspension is disclosed.

9 Claims, 7 Drawing Sheets

5,526,899

GREASE FITTING ADAPTER FOR THE SUSPENSION FOR HEAVY DUTY VEHICLES

FIELD OF THE INVENTION

The present invention relates to an apparatus for lubricating the suspension of a heavy duty vehicle, and more particularly, to an adapter for a Hendrickson "Walking Beam" suspension which may be retrofitted.

BACKGROUND ART

Many heavy duty vehicles such as dump trucks and tractors for eighteen (18) wheelers have a Hendrickson "Walking Beam" suspension which is disposed generally longitudinally and is arranged on each side of the vehicle. The Hendrickson suspension is a major support system for heavy duty vehicles, and the suspension moves very slightly in all three directions to absorb shock and stress on the vehicle. Hence, the suspension is called a "Walking Beam".

This Hendrickson "Walking Beam" suspension has a stack of leaf springs disposed above the beam, and the beam has an enlarged center portion provided with a bronze bushing therein. This bushing is lubricated by means of a grease fitting threaded into the beam near the center thereof.

Unfortunately, this grease fitting is located on the inner side of the Hendrickson suspension and is not accessible from the outer side of the vehicle. In order to lubricate the "Walking Beam" suspension (and more particularly, the grease fitting thereon), a truck driver, mechanic or maintenance person must lie down under the vehicle and face upwardly so as to bring a grease "gun" or applicator to the fitting. Usually, the person lies on a "creeper" and slides under the vehicle. Also, the vehicle may be in a field situation, and not in a garage, whereby access to the underside of the vehicle is even more difficult. The person lubricating the "Walking Beam" suspension must assure that the vehicle is not driven or moved while he (or she) is under the vehicle. There is a possibility of injury and, as a result, a reluctance to lubricate the suspension. Consequently, the vehicle suspensions are not lubricated on a weekly basis as recommended, and the lack of proper lubrication detracts from the life and reliability of the "Walking Beam" suspension and precipitates early failure and costly repairs and replacement (as well as "down time" for the heavy-duty vehicle).

Despite the existence of this problem for many years, and despite the great body of prior art on lubrications (generally) no one, to date, has solved this inherent problem nor facilitated a convenient means for lubricating the "Walking Beam" suspension.

For example, Hirst, in U.S. Pat. No. 1,447,177, disclosed a leaf-spring-lubricating device, wherein a lubricant-conveying pipe is screwed into one side of a receptacle and is bent to extend vertically. The lubricant passes from the receptacle down through bolt holes and is distributed between and along the individual spring leaves.

Van Pelt, in U.S. Pat. No. 1,580,181, disclosed a lubricator, wherein a transverse suspension bar is attached at its ends to the vehicle frame. The supply of oil is fed to the lubricating pad through an oil feed pipe or tube preferably fashioned integrally with the attaching plate and extending along one side thereof from the holder with which the pipe communicates.

In U.S. Pat. No. 2,003,032, Barks et al disclosed a lubricating apparatus, wherein oil passes through a member and out of a nozzle to a position from whence it spreads within the confines of canvas surrounded by a metallic cover. A C-shaped clamp is provided having an adjustable buttress screw and an oppositely located clamp screw, the latter being hollow and containing a slidable inlet tube. The inlet end of member is provided with a suitable connection for a lead-in hose, the other end of which is connected to a suitable lubricant compressor.

A curved tube for a grease gun was disclosed by House in U.S. Pat. No. 2,614,660.

Jones, Jr., in U.S. Pat. No. 3,743,054 disclosed a means for a trailer fifth-wheel lubrication, wherein a lubricating tube is welded or otherwise secured to the bottom plate of a tractor and is disposed parallel with the longitudinal axis of the trailer. The projecting front end of tube is connected to a grease gun adapted to be manually manipulated. Grease from the cartridge within the gun is forced through a tube and deposited through openings in the tube through registering holes in the plate.

In U.S. Pat. No. 5,339,924, Martins discloses a dosing device for a lubricating mechanism. A housing with a defined volume has a piston movable in an axial direction to define two chambers. The chambers are connected to a supply of lubricant. The applicant is also aware of a manifold type of lubricating system used on earth-moving and excavating types of heavy equipment. In this manifold system, a single fitting into which lubricant is introduced, is connected to a plurality of hoses or tubes which direct the lubricant to the parts of the equipment which require lubrication. This lubrication system is factory installed and the applicant is not aware of any retrofit devices which are available.

However, none of these prior art devices are directed to nor readily applicable to, a Hendrickson "Walking Beam" suspension, nor are these prior art devices directed to an adapter to retrofit a vehicle to facilitate lubrication from a side of the vehicle, thereby avoiding the need to lubricate from beneath the vehicle.

The applicant is also aware of a lubrication system used on heavy duty equipment such as cranes made by the Catapiller Corp. The lubrication system has a single fitting which is connected to a manifold to direct the lubricant to a plurality of bushings and joints which require lubrication. The manifold system is distinguishable from the present invention in that it is a manifold, is not retrofit but is original equipment, and is not mounted on a Hendrickson or similar suspension.

SUMMARY OF THE INVENTION

It is an object of the present invention to provide an adapter to facilitate lubrication of a Hendrickson "Walking Beam" suspension on a vehicle.

It is a further object of the present invention to provide an adapter which can be readily attached to the suspension as a retrofit.

In accordance with the teachings of the present invention, there is disclosed herein a grease fitting adapter for lubricating a Hendrickson suspension of a vehicle to facilitate lubrication. The adapter includes a mounting means for attaching the adapter to the suspension. A hose is connected to the mounting means, and the hose has a first end and an opposite second end. The first end has a fitting thereon, and the second end has a grease fitting thereon. The adapter may be retrofitably attached to the Hendrickson suspension such that the fitting on the first end of the hose may engage a complementary fitting on an inner side of the Hendrickson suspension. The second end of the hose is disposed on an outer side of the vehicle. Lubricant may be introduced into the grease fitting on the second end of the hose, wherein the Hendrickson suspension may be lubricated from the outer side of the vehicle, thereby avoiding the need to introduce lubricant from beneath the vehicle.

Further in accordance with the teachings of the present invention, a retrofit kit is provided and a method of lubricating a Hendrickson suspension of a vehicle from the side of the vehicle is disclosed.

These and other objects of the present invention will become apparent from a reading of the following specification, taken in conjunction with the enclosed drawings.

DESCRIPTION OF THE PREFERRED EMBODIMENT

Figure 1:
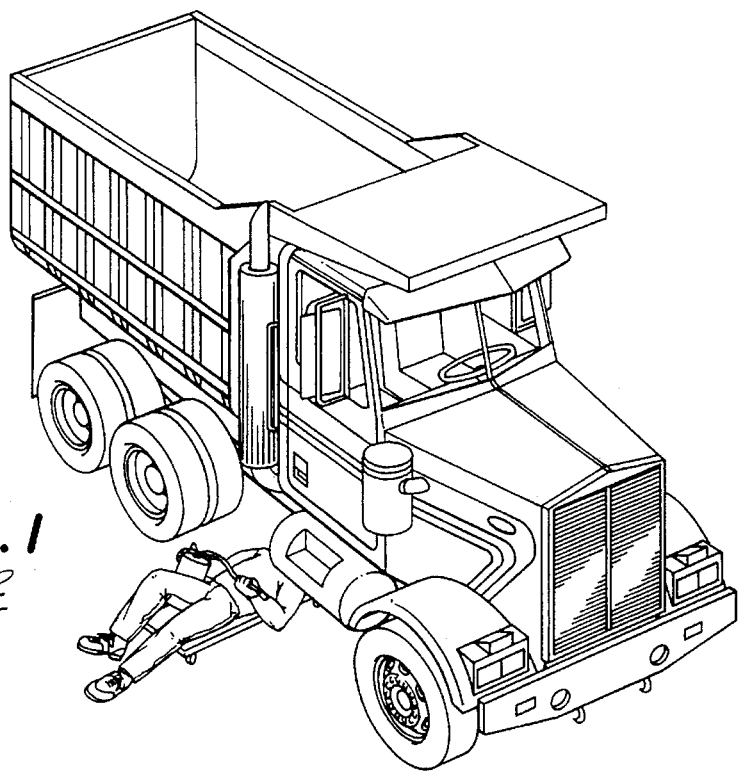
FIG. 1 is a pictorial view of a vehicle showing the person sliding (on a "creeper") under the vehicle to lubricate the suspension according to the prior art.
Figure 2:
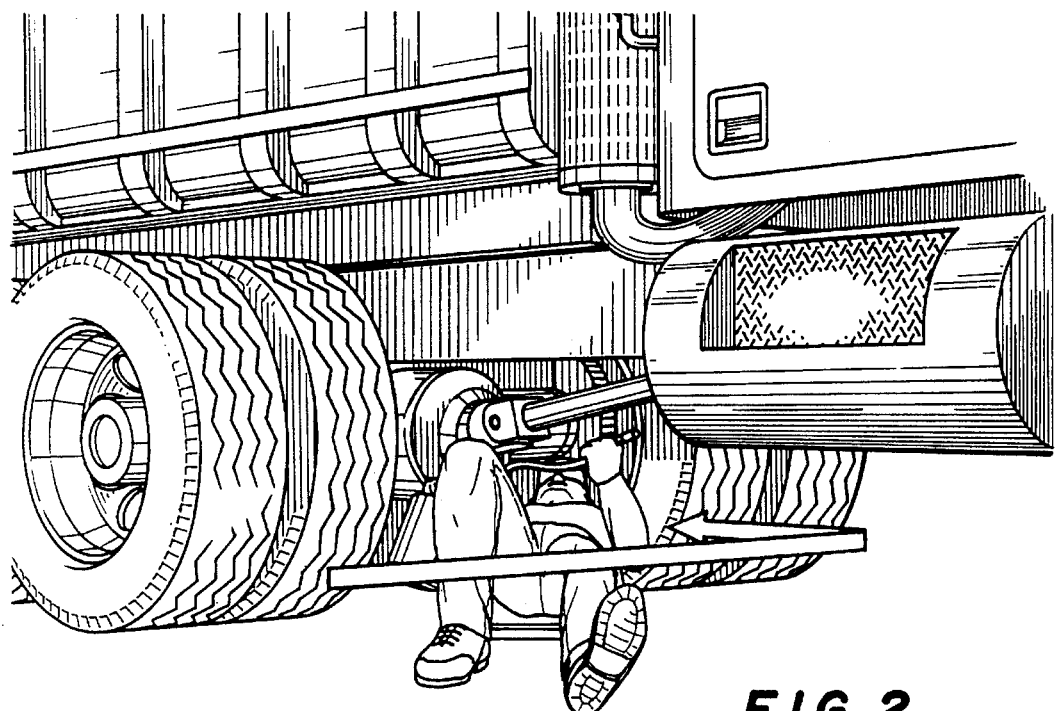
FIG. 2 is a further sequential pictorial view showing how the person is required to maneuver under the vehicle according to the prior art.
Figure 3:
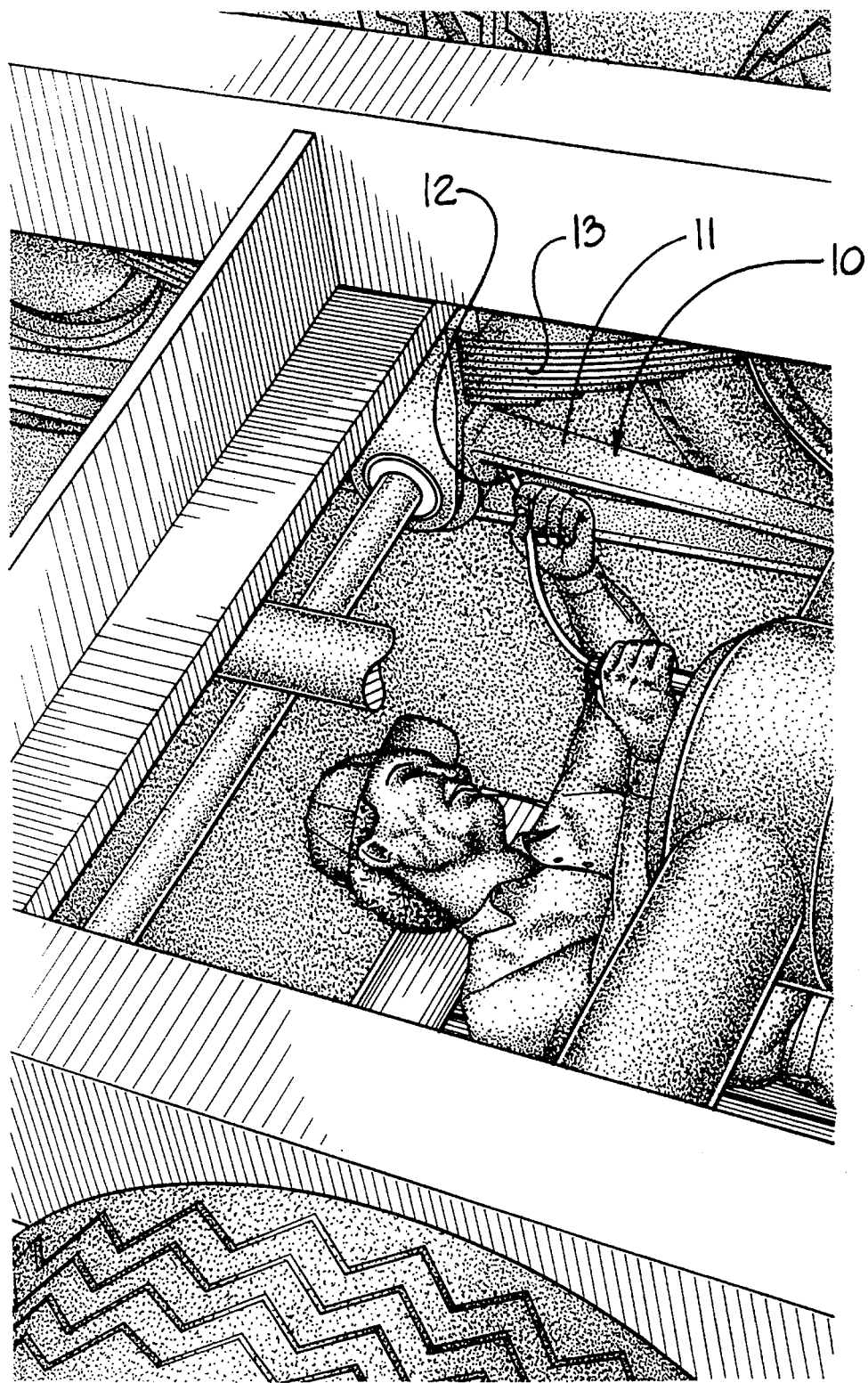
FIG. 3 is a pictorial view of the prior art showing the person under the vehicle (and looking up) to introduce lubricant into the fitting on the inner side of the suspension.
Figure 4:
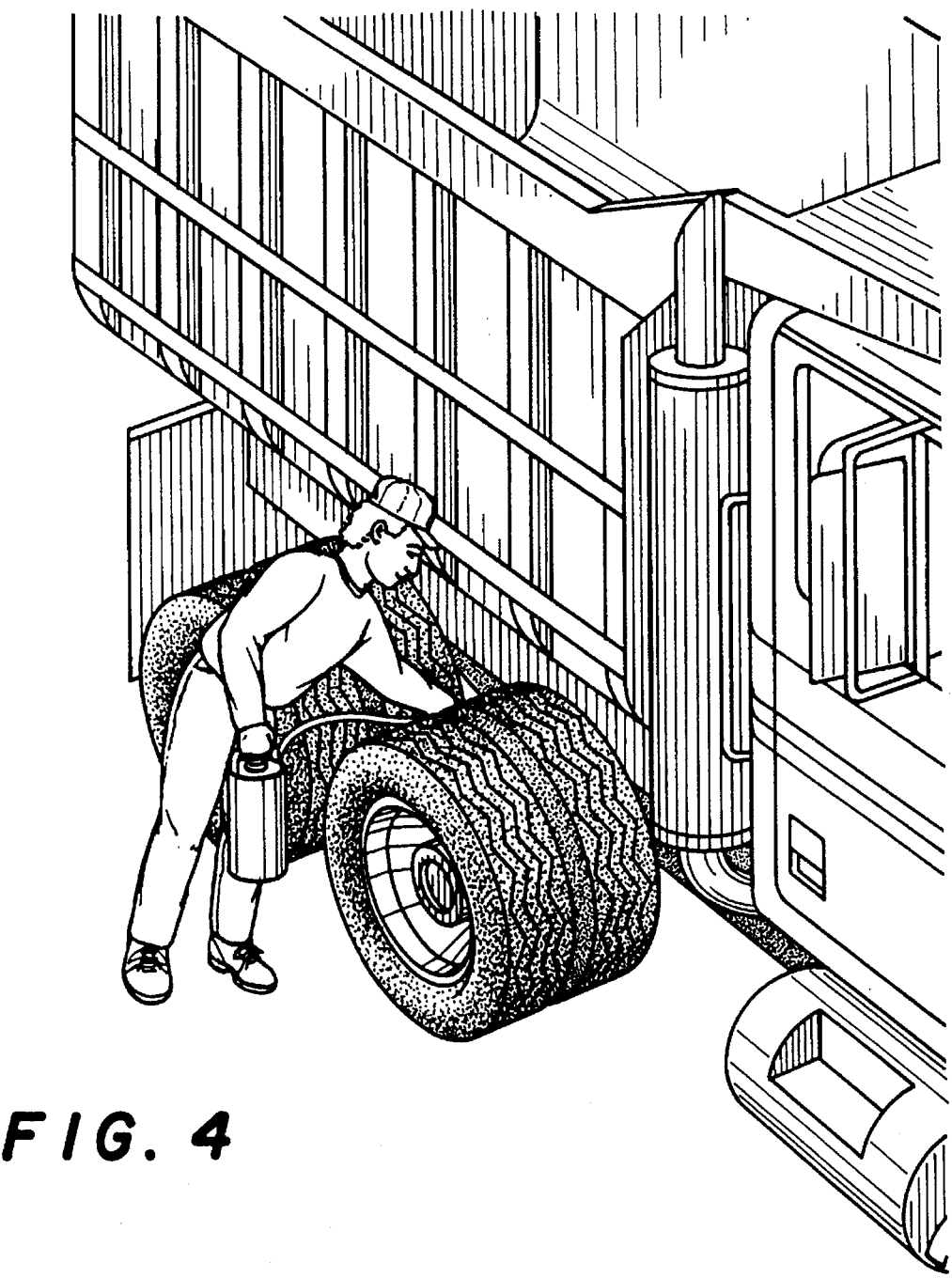
FIG. 4 is a pictorial view of a vehicle on which the present invention has been installed showing a person standing alongside the vehicle and conveniently and quickly lubricating the suspension without risk of injury.

The Hendrickson suspension 10 is widely used on heavy equipment such as dump trucks, tractors for eighteen (18) wheelers and similar vehicles. The suspension is a heavy duty system which absorbs a portion of the shock and stress to which these vehicles are exposed. The Hendrickson suspension 10 is an I-shaped beam 11 with a metal bushing approximately centered therein and with a rubber bushing at either end. A lubrication fitting 12 is connected to the inner side of the Hendrickson suspension between the upper and lower flanges of the I-shaped beam 11 and approximately in the center of the suspension. The fitting 12 preferably is threaded into an opening in the beam adjacent to the center bushing such that lubricant introduced into fitting 12 is transmitted into the bushing (FIGS. 1–3). The Hendrickson suspension also has a stack of leaf springs 13 connected to the beam 11 and mounted above the beam 11.

It is recommended that the suspension 10 be lubricated on a weekly basis to provide adequate support for the vehicle and to prevent degradation and damage to the vehicle.

A Hendrickson suspension 10 is mounted on each side of the vehicle in a front to back (longitudinal) orientation. Typically, the center bushing of the suspension is located between the pair of rear drive wheels of the vehicle. The disposition of Hendrickson suspension 10 is with the lubrication fitting 12 inside the frame of the vehicle and accessible only from beneath the vehicle.

When a mechanic or driver lubricates the vehicle, the person must get under the vehicle on a "creeper" or similar device (FIGS. 1 and 2). Facing upwardly, the person connects a supply of lubricant to the lubrication fitting 12 in the Hendrickson suspension 10 on one side of the vehicle and then on the other side of the vehicle. Also, since the vehicle is frequently used on unpaved terrain, there is an accumulation of dirt, mud and clay on the underside of the vehicle and over the lubrication fitting 12 on the Hendrickson suspension which must be physically removed before lubricant can be introduced into the lubrication fitting 22.

Due to potential hazards of getting under the vehicle, the confined space under the vehicle in which to work, the uncertain availability of "creepers" and the lack of motivation of drivers, the Hendrickson suspensions are generally not provided with the recommended weekly lubrication.

The present invention overcomes these problems. The grease fitting adapter 14 has mounting means to attach the adapter 14 to the suspension 10. Preferably, the mounting means is a U-shaped bracket 16 which has a first leg 18 and an opposite second leg 20. A hose 22, preferably flexible, is connected to bracket 16. It is preferred that the hose 22 be connected to the base portion of the bracket 16 between the legs 18, 20 and on the side of the base portion opposite from the legs 18, 20. The hose 22 has a first end 24 and an opposite second end 26. The first end 24 of the hose 22 terminates approximately at the first leg 18 of the bracket 16, and the second end 26 of the hose 22 extends beyond the second leg 20 of the bracket 16. The first end 24 of the hose 22 has a fitting 28 thereon. The fitting 28 cooperates with a fitting 30 in the Hendrickson suspension 10 such that when the fittings 28, 30 are connected, lubricant may be transmitted from the hose 22 into the appropriate channels in the Hendrickson suspension 10. The second end 26 of the hose 22 has a fitting 32 thereon, preferably a male grease fitting. The male grease fitting 32 is a standard type of fitting which receives a standard grease gun or lubricant hose such that the lubricant can be introduced from an external source into the hose 22 and into the Hendrickson suspension 10.

Figure 5:
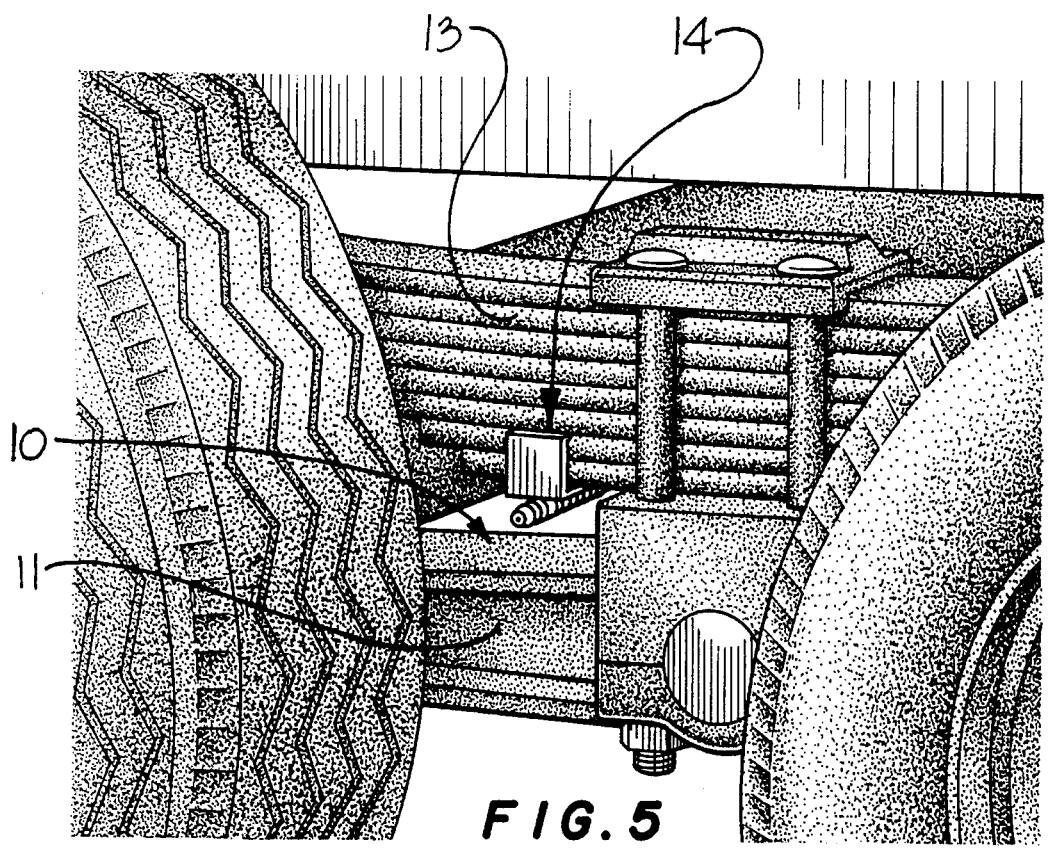
FIG. 5 is an enlarged view of FIG. 4 showing the present invention installed on the suspension.
Figure 6:
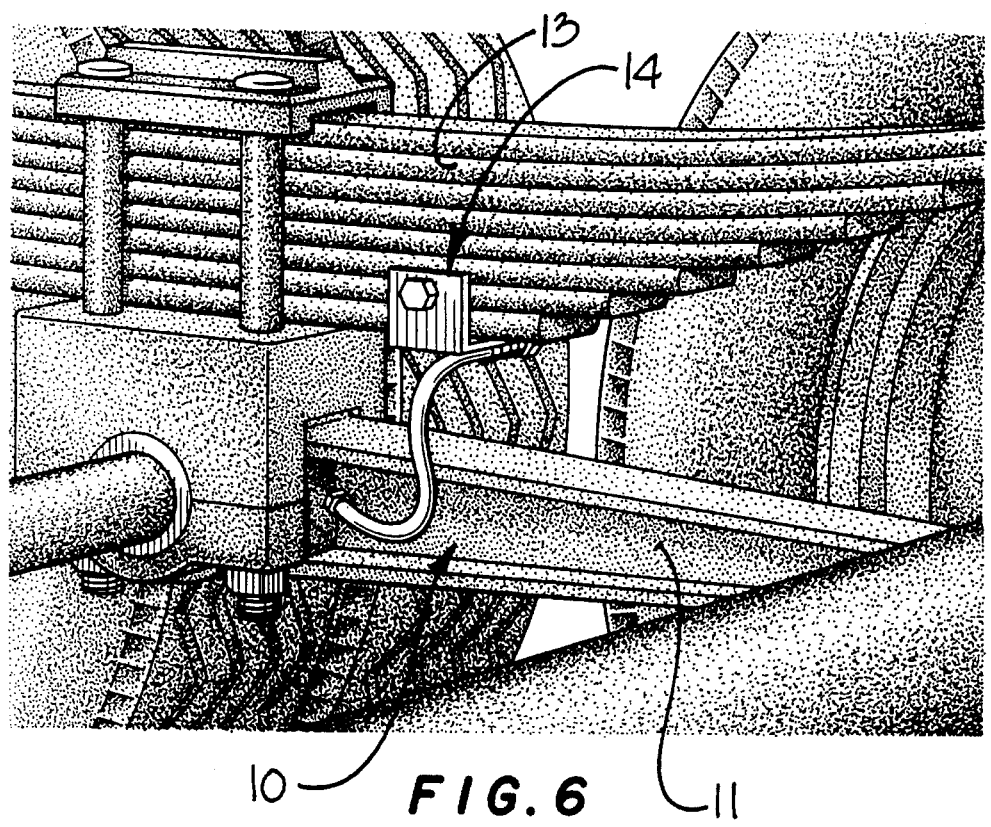
FIG. 6 is a view of FIG. 5 from the interior of the suspension.
Figure 7:
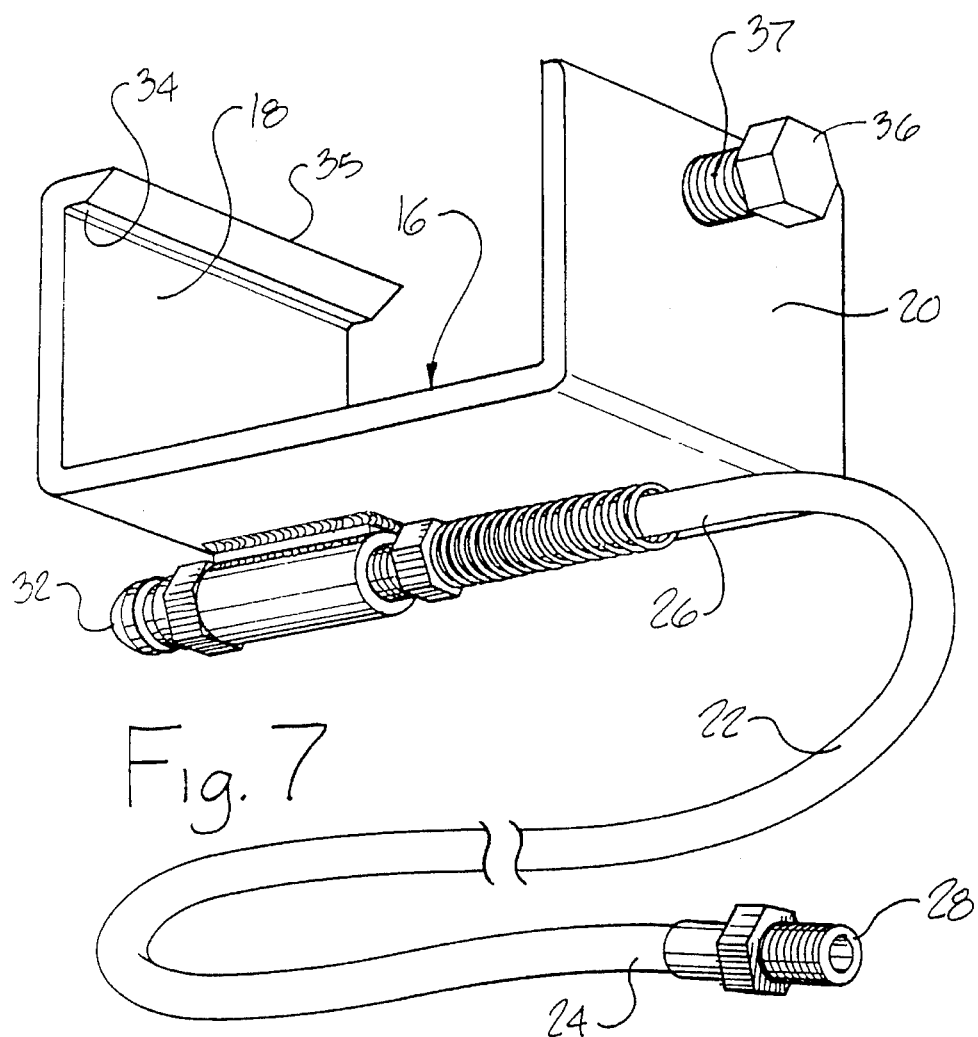
FIG. 7 is a perspective view of an embodiment of the present invention showing a hose attached to a U-shaped bracket, the bracket having a first leg with a bend and a knife edge thereon and a second leg with a fastening means.
Figure 8:
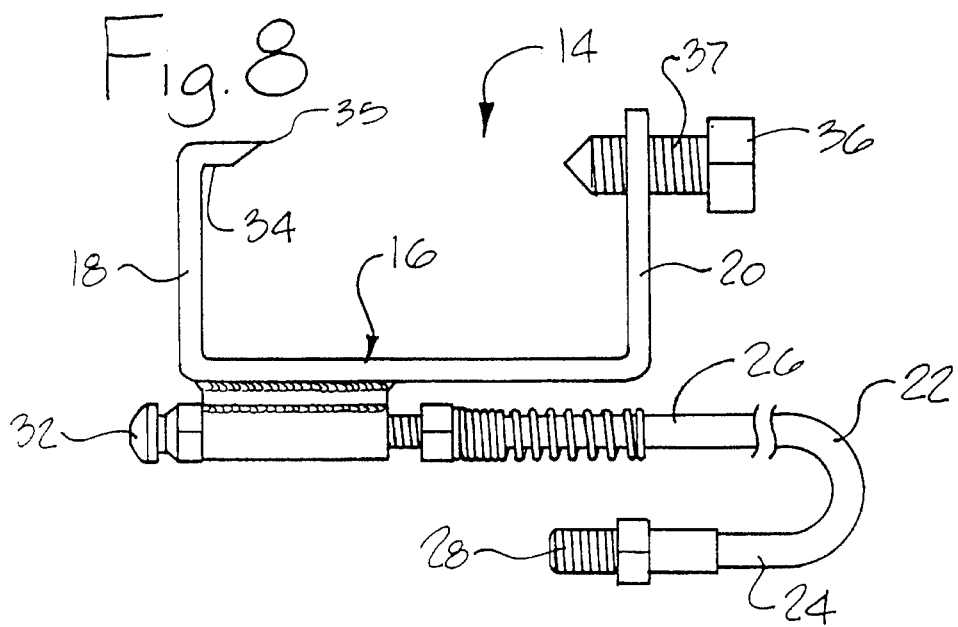
FIG. 8 is a side elevation view of the embodiment of FIG. 7.
Figure 9:
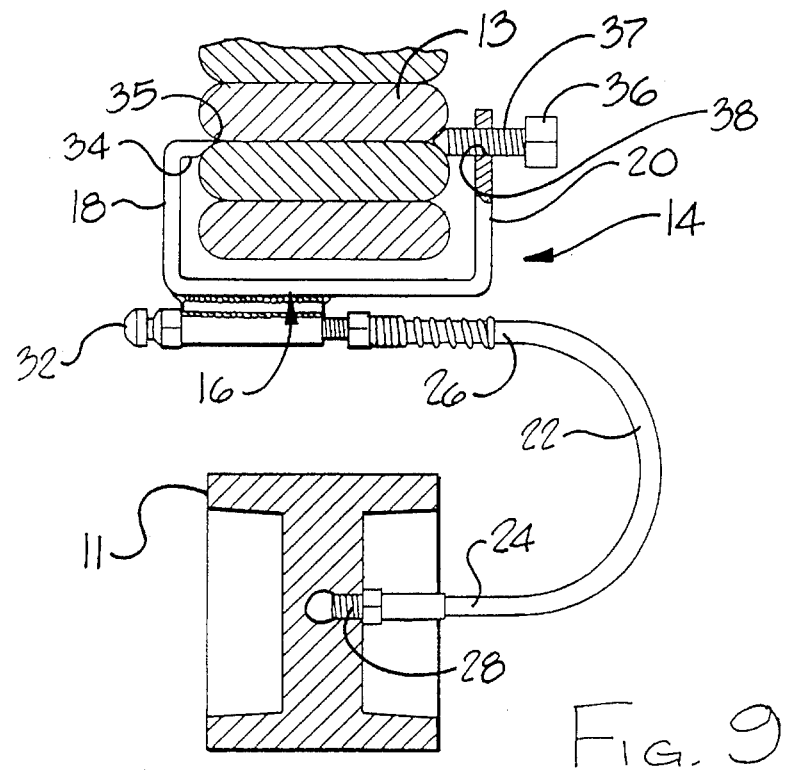
FIG. 9 is a cross-sectional of the embodiment of FIG. 7, showing its installation on the Hendrickson suspension.
Figure 11:
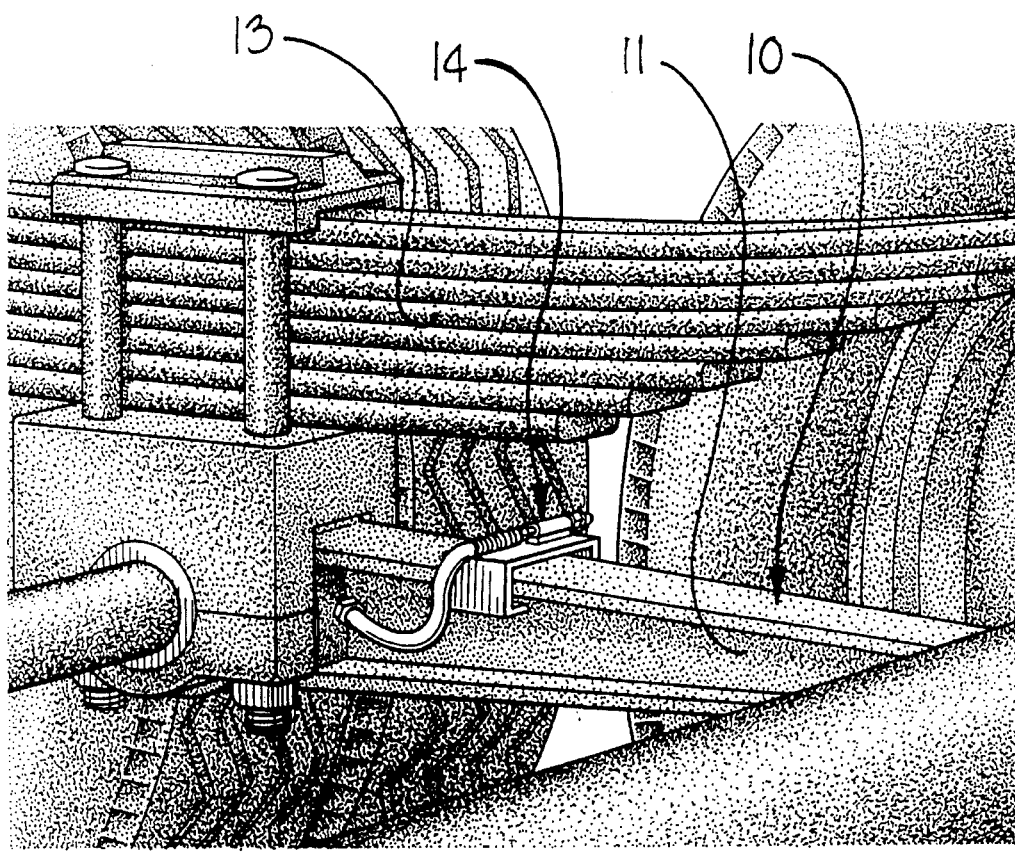
FIG. 11 is a perspective view of the present invention mounted on the beam of the suspension.

In one embodiment (FIGS. 7–8), the first end of the first leg 18 has a bent portion 34 thereon. The bent portion 34 is chamfered to have a knife edge 35 formed thereon. The second leg 20 has an adjustable fastening means 36 formed thereon. The adjustable fastening means may be a threaded screw 37 received in a complementary threaded opening 38, a clamp or other fastening means. The bracket 16 is fastened to a plurality of leaf springs 13 disposed on the vehicle immediately above the Hendrickson suspension beam 11 (FIGS. 5, 6 and 9). The knife edge 35 is received between an adjacent pair of leaf springs 13, and the bracket 16 straddles the leaf springs 13 such that the second leg 20 of the bracket 16 is oriented on the exterior side of the leaf springs 13 facing the wheels of the vehicle. In this manner, the male grease fitting 32 is easily accessible with no need to lubricate from beneath the vehicle. This embodiment may also be attached directly to the beam 11 (FIG. 11).

Figure 10:
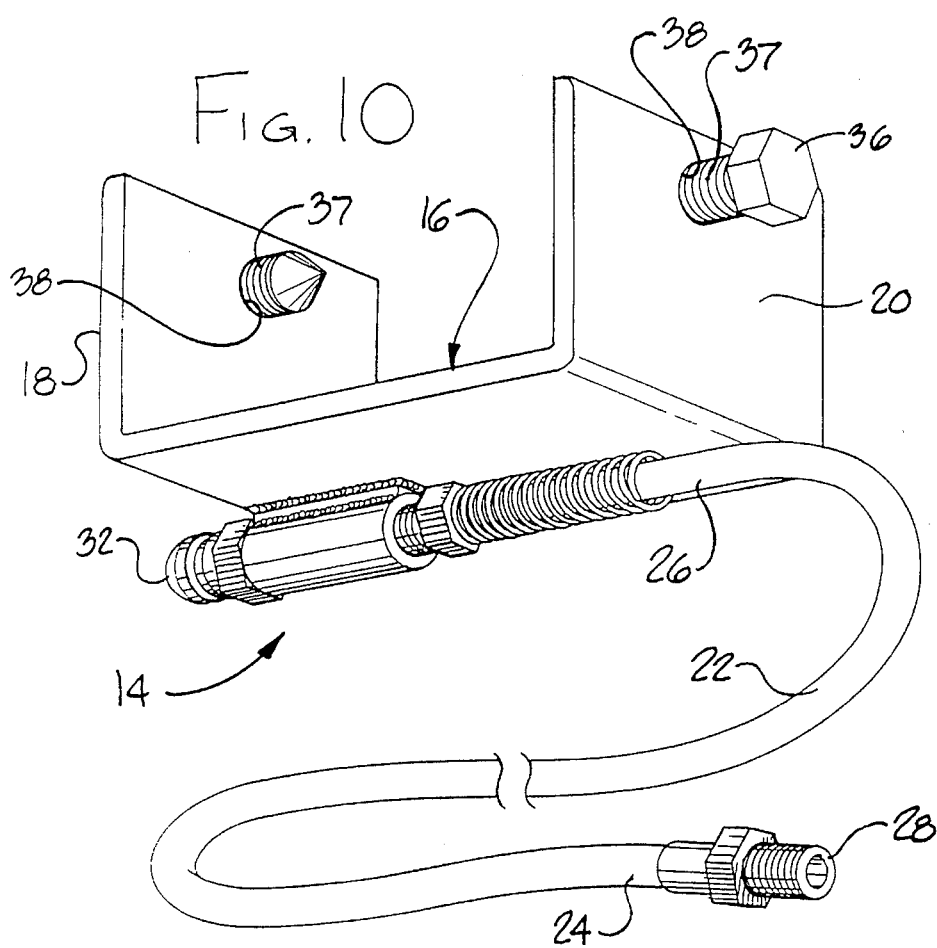
FIG. 10 is a perspective view of yet another embodiment of the present invention showing a hose attached to a U-shaped bracket, the bracket having a first and a second leg, each leg having a fastening means.

In an alternate embodiment (FIG. 10), the first leg 18 of the bracket 16 is formed in the same manner as the second leg 20, having a fastening means 36 formed thereon. The bracket 16 is disposed with the legs 18, 20 straddling either the I-shaped beam 11 (FIG. 11) or the leaf springs 13 of the Hendrickson suspension 10, the first leg 18 oriented toward the interior of the frame of the vehicle and the second leg 20 oriented toward the exterior of the frame of the vehicle. The bracket 16 is secured to the Hendrickson suspension 10 by engaging the fastening means 36 on each of the legs 18, 20 of the bracket 16 against the Hendrickson "Walking Beam" suspension 10.

A kit for retrofitting the adapter 14 of the present invention includes the bracket 16 of any of the above described configurations with the hose 22 attached to the bracket 16. The bracket 16 has a first leg 18, a second leg 20 and a fastening means 36 on the second leg 20. The hose 22 has the fittings 28 and 32 as described above. Tools, such as wrenches and pliers available to any mechanic, are required and may be included in the retrofit kit if desired. The retrofit kit is used by removing the fitting 30 from the Hendrickson suspension 10. The fitting 30 usually has a threaded end and the fitting 30 is removed by unthreading the fitting 30 from the cooperating threaded opening in the Hendrickson suspension 10. The fitting 28 on the first end 24 of the hose 22 has threads formed thereon cooperating with the threads in the opening in the Hendrickson suspension 10 and the first end 24 of the hose 22 is connected to the Hendrickson suspension 10. The bracket 16 is disposed straddling the Hendrickson suspension 10 with the first leg 18 of the bracket 16 oriented toward the interior of the frame of the vehicle and the second leg 20 oriented toward the exterior of the vehicle. The male grease fitting 32 is thereby disposed on the exterior of the vehicle and accessible to a person without the need to get underneath the vehicle. The bracket 16 is secured to the I-shaped beam 11 or to the leaf springs 13 of the Hendrickson suspension by the fastening means 36. It should be noted that all the embodiments disclosed herein may be connected to either the I-shaped beam 11 or the leaf springs 13 and are not considered for attachment to exclusively the I-shaped beam 11 or the leaf springs 40.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A grease fitting adapter for lubricating a Hendrickson suspension of a vehicle to facilitate lubrication, the adapter comprising: a U-shaped bracket for attaching the adapter to the suspension, the U-shaped bracket having a base portion, a first leg and an opposite second leg, at least one of the legs carrying an adjustable fastening means for securing the bracket to the vehicle, a hose having a first end and an opposite second end, the second end of the hose being connected to the U-shaped bracket, the first end having a fitting thereon, the second end having a grease fitting thereon, wherein the adapter may be retrofitably attached to the Hendrickson suspension such that the fitting on the first end of the hose may engage a cooperating fitting on an inner side of the Hendrickson suspension, the grease fitting on the second end of the hose being disposed on an outer side of the vehicle, wherein lubricant may be introduced into the grease fitting on the second end of the hose, and wherein the Hendrickson suspension may be lubricated from the outer side of the vehicle avoiding the need to introduce lubricant from beneath the vehicle.

2. The adapter of claim 1, wherein the Hendrickson suspension includes at least one "walking" beam arranged generally longitudinally of the vehicle, wherein the U-shaped bracket is attached straddling the "walking" beam and transversely thereto.

3. The adapter of claim 1, wherein the Hendrickson suspension includes a plurality of stacked leaf springs, the U-shaped bracket being connected to the leaf springs such that the legs of the bracket are received between respective leaf springs and the adjustable fastening means secure the bracket to the leaf springs.

4. The adapter of claim 1, wherein the adjustable fastening means comprises a threaded opening in the at least one of the legs, a bolt having cooperating threads thereon being received in the threaded opening, wherein the bolt is rotated to engage the suspension and secure the bracket to the suspension.

5. A grease fitting adapter for lubricating a Hendrickson suspension of a vehicle to facilitate lubrication, the adapter comprising: a mounting means for attaching the adapter to the suspension, a hose connected to the mounting means, the hose having a first end and an opposite second end, the first end having a fitting thereon, the second end having a grease fitting thereon, wherein the adapter is retrofitably attached to the Hendrickson suspension such that the fitting on the first end of the hose engages a cooperating fitting on an inner side of the Hendrickson suspension, the second end of the hose being disposed on an outer side of the vehicle, wherein lubricant is introduced into the grease fitting on the second end of the hose, and wherein the Hendrickson suspension is lubricated from the outer side of the vehicle avoiding the need to introduce lubricant from beneath the vehicle, wherein the Hendrickson suspension has a plurality of stacked leaf springs, and wherein the mounting means of the adapter comprises a U-shaped bracket having a first leg and an opposite second leg, the first leg having a first end having a bent portion thereon, the bent portion being oriented inwardly toward the second leg, the bent portion being chamfered and forming a knife edge, the second leg carrying an adjustable fastening means such that the bracket may be connected to the leaf springs wherein the knife edge is received between an adjacent pair of the leaf springs, the U-shaped bracket straddling the leaf springs and the fastening means on the bracket being secured to the leaf springs.

6. A grease fitting adapter for lubricating a suspension on a vehicle, the suspension having a beam, the beam having a central portion having a bearing means disposed therein, a grease fitting on an inner side of the beam adjacent to the bearing means and a stack of leaf springs connected to the beam and disposed above the center portion thereof, the grease fitting adapter comprising a bracket having a first leg and an opposite second leg, the first leg having a hook means formed on an end thereof, the second leg carrying a fastening means, wherein the hook means are engaged between a pair of adjacent leaf springs on an inner side of the leaf springs, the bracket straddling the leaf springs and the fastening means being disposed on an outer side of the leaf springs securing the bracket to the leaf springs, the bracket having a hose attached thereto, the hose having a first end and an opposite second end, the first end having a fitting thereon, the fitting being connected to and cooperating with the grease fitting on the inner side of the beam, the second end of the hose having a grease fitting thereon wherein lubricant is introduced into the grease fitting from the outer side of the leaf springs avoiding the need to introduce lubricant from underneath the vehicle into the grease fitting on the inside of the beam.

7. In a suspension for a heavy-duty vehicle, wherein the suspension includes at least one "walking" beam arranged generally longitudinally of the vehicle and on a side thereof substantially inwardly of the rear wheels of the vehicle, wherein the beam includes a central portion lubricated via an existing grease fitting facing inwardly of the vehicle, such that to lubricate the grease fitting a person typically lies down on a "creeper" while holding a grease gun, slides beneath the vehicle, turns around, and facing up squirts lubrication into the grease fitting, the improvement comprising a retrofit attachment secured to the vehicle by a bracket having a base portion with a pair of opposite parallel legs connected to the base portion, at least one of the legs carrying an adjustable fastening means for securing the bracket to the vehicle, a flexible hose having two opposite ends, one end being connected to the base portion of the bracket, the hose end of the flexible hose carrying a first fitting facing outwardly of the suspension and conveniently accessible externally of the vehicle, the opposite end of the flexible hose carrying a second fitting which cooperates with the existing grease fitting on the suspension, such that a maintenance person may merely walk up to the vehicle, stand substantially erect, and using the grease gun or its equivalent, conveniently squirt lubrication into the fitting, and through the hose and second fitting into the suspension, thereby conveniently lubricating the suspension without getting dirty and without risk of injury, and thereby facilitating the maintenance of the suspension and improving the life and reliability thereof.

8. A kit for retrofitting a Hendrickson suspension on a vehicle to facilitate lubrication of said suspension through a lubrication fitting disposed on an inner side of said suspension, the kit comprising: a U-shaped bracket having a base portion, a first leg and an opposite second leg, at least one of the legs carrying an adjustable fastening means for attaching the bracket to the Hendrickson suspension, a hose having a first end and an opposite second end, the second end of the hose being attached to the U-shaped bracket, the first end of the hose having a fitting thereon, the second end having a grease fitting thereon, such that the fitting on the first end of the hose engages the cooperating fitting on the inner side of Hendrickson suspension, the second end of the hose being disposed on the outer side of the vehicle such that grease is introduced into the grease fitting on the second end of the hose on the outer side of the vehicle, thereby avoiding the need to introduce lubrication from beneath the vehicle.

9. A method of lubricating a Hendrickson suspension on a vehicle, the Hendrickson suspension having a lubrication fitting disposed on an inner side of said suspension, the lubricant being introduced from an outer side of the vehicle and avoiding the introduction of lubricant from beneath the vehicle, the method comprising the steps of providing a U-shaped bracket having a first leg and an opposite second leg, at least one of the legs carrying an adjustable fastening means for securing the bracket to the vehicle, a hose having a first end with a fitting thereon and the hose having a second end with a grease fitting thereon, the second end of the hose being connected to the U-shaped bracket, connecting the fitting on the first of the hose to the cooperating fitting on the Hendrickson suspension, connecting the bracket transversely to the Hendrickson suspension wherein the legs of the bracket straddle the Hendrickson suspension, securing the bracket to the Hendrickson suspension wherein the grease fitting on the second end of the hose is disposed on the outer side of the vehicle and introducing lubricant into the grease fitting to lubricate the Hendrickson suspension.

* * * * *